H. B. NICHOLS.
GRINDING MACHINE.
APPLICATION FILED AUG. 21, 1908.

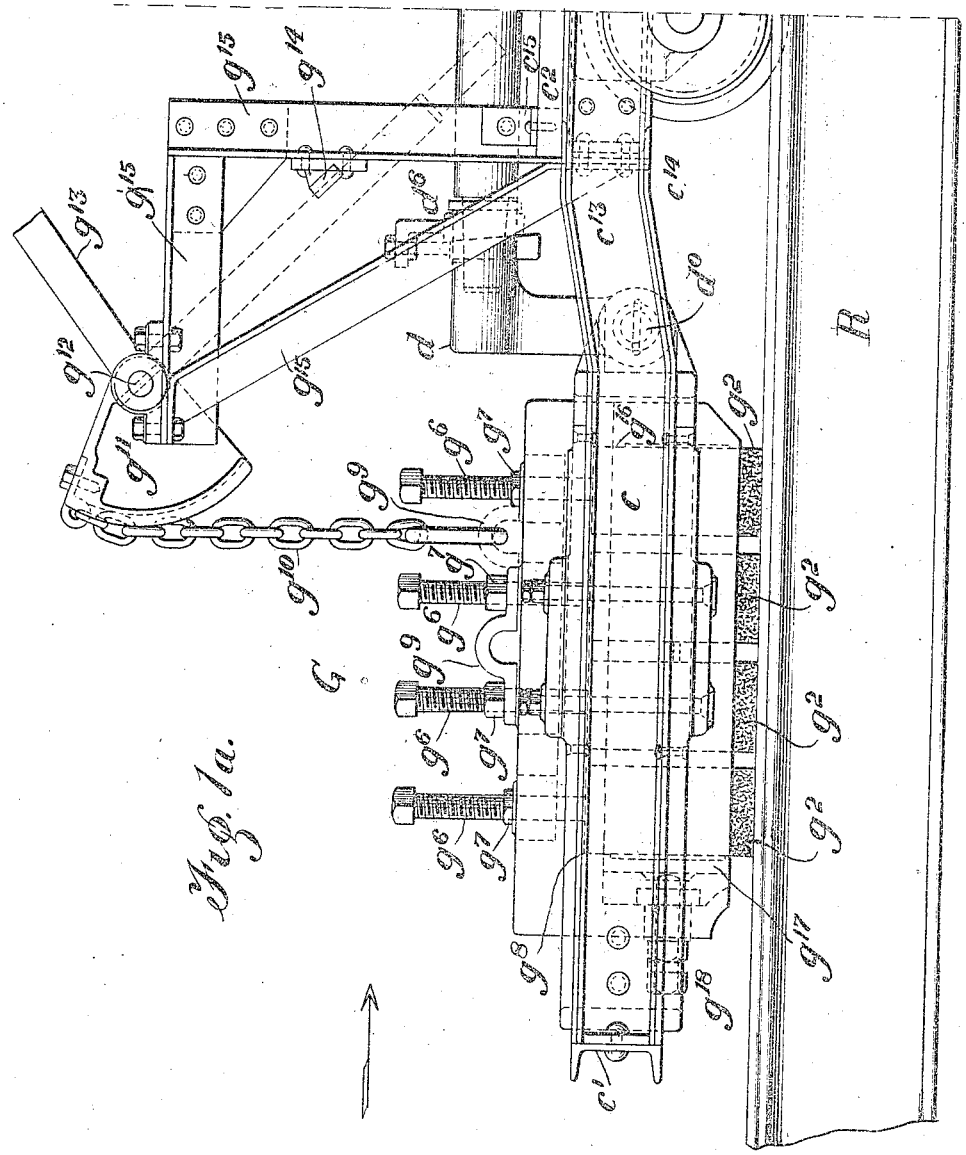

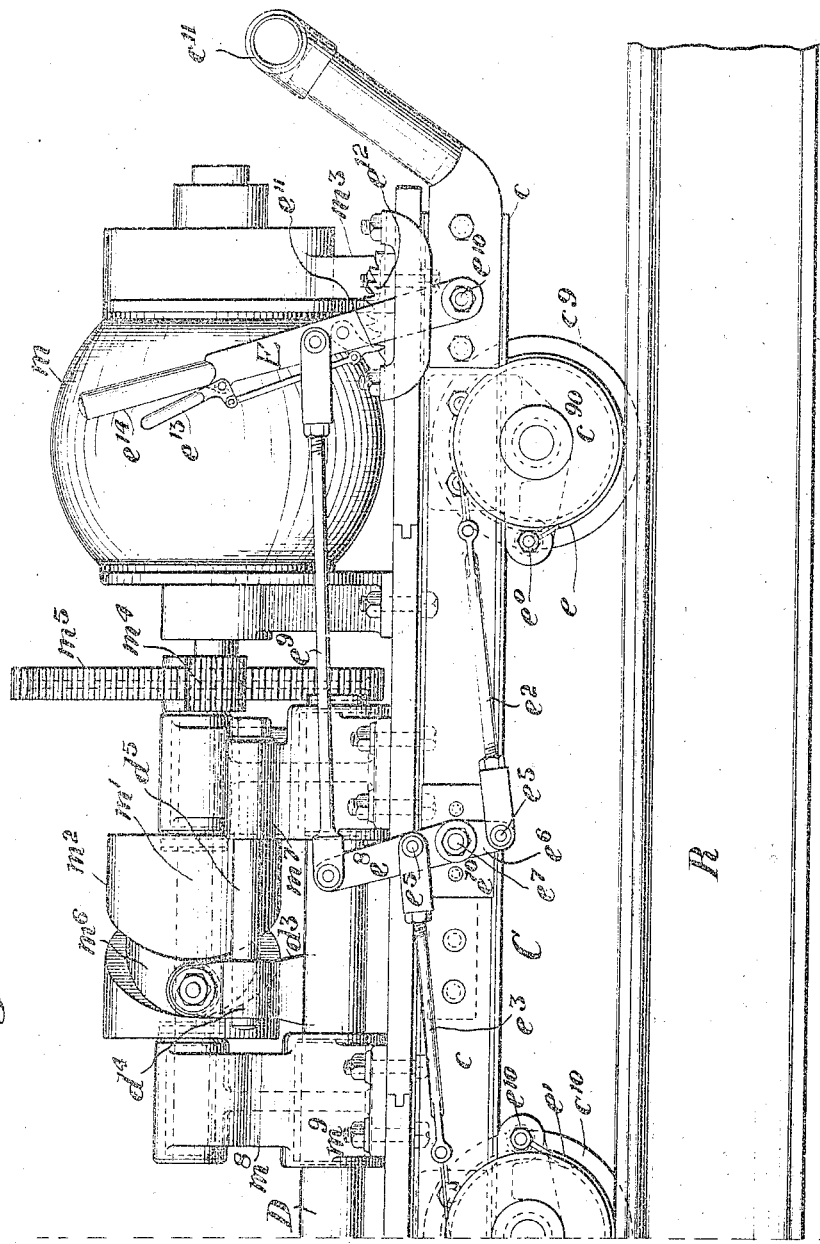

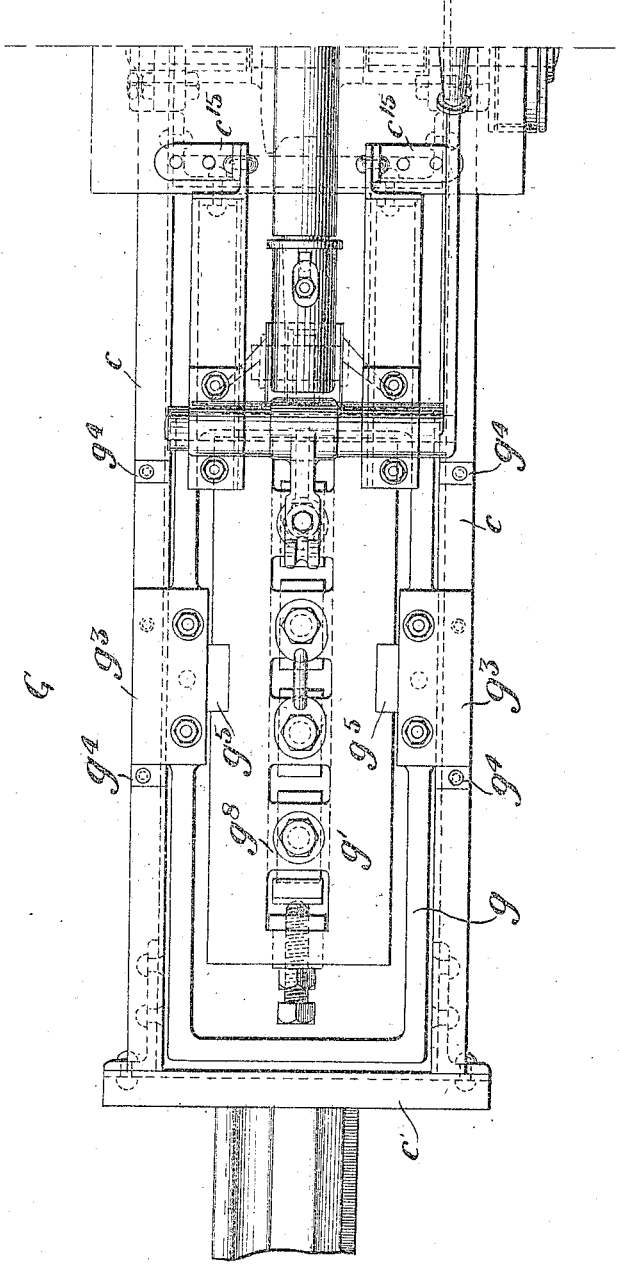

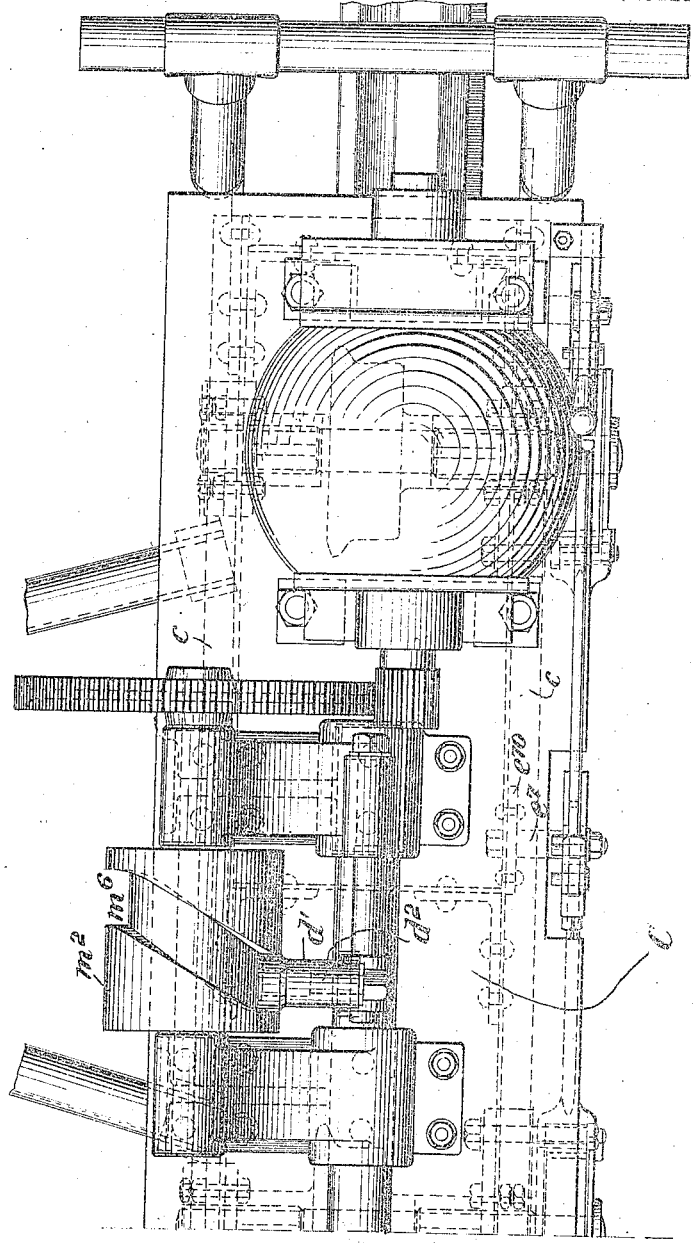

944,147.

Patented Dec. 21, 1909
7 SHEETS—SHEET 5.

Fig. 3.

Witnesses
H. Löwenstein.
James A. Marr

Inventor
Henry B. Nichols
Edward E. Clement
By
Attorney

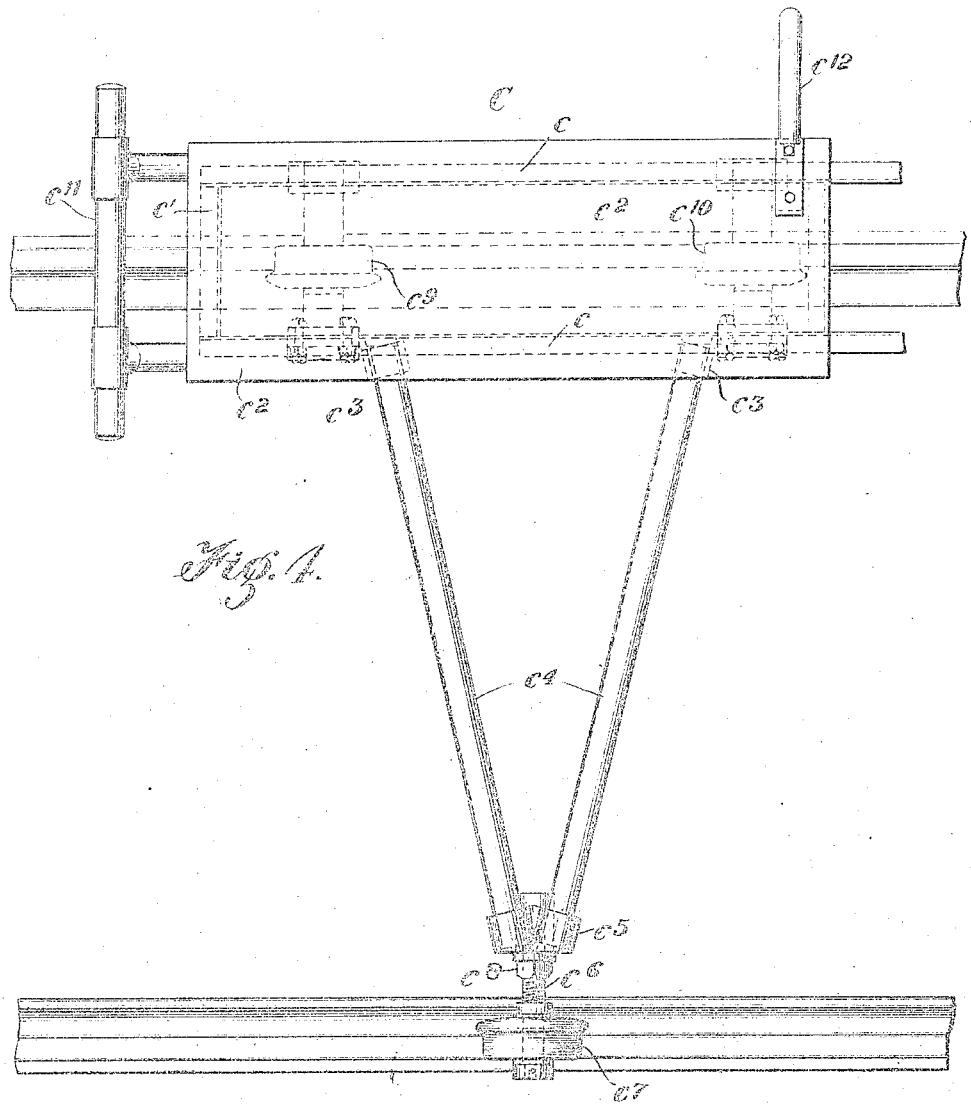

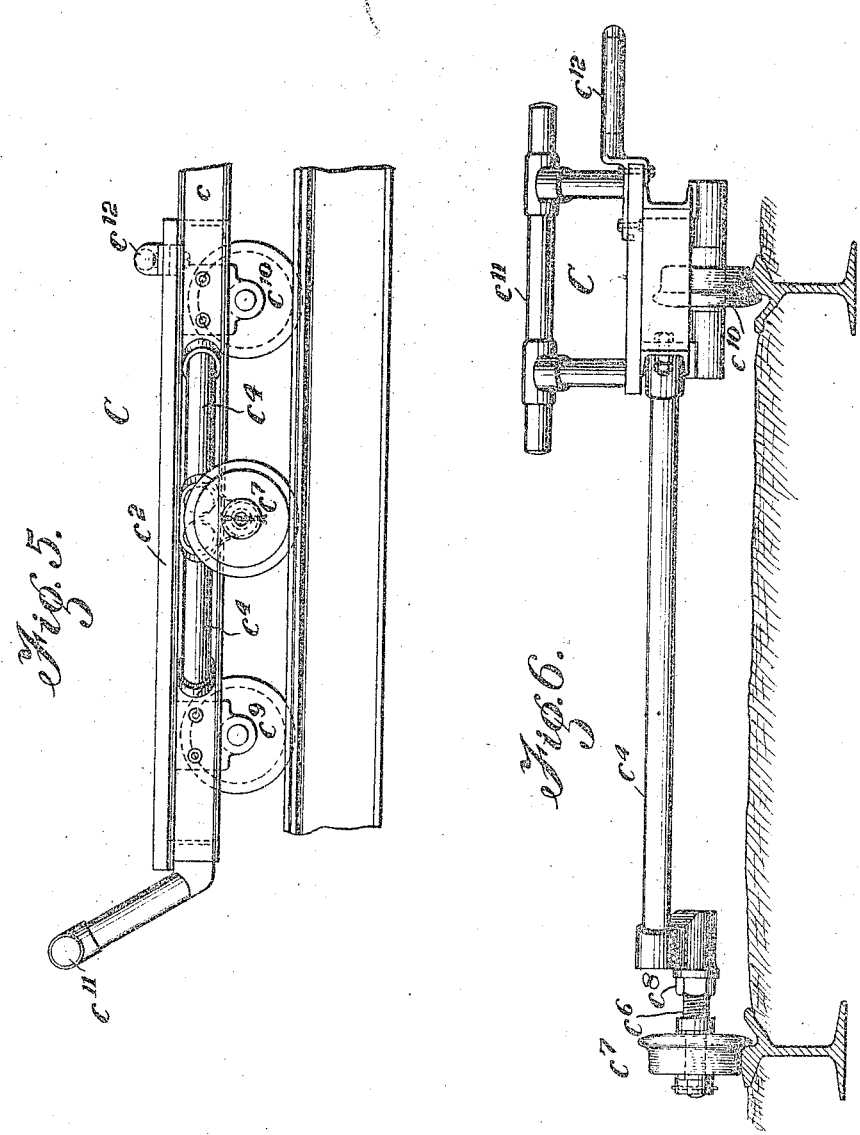

UNITED STATES PATENT OFFICE.

HENRY B. NICHOLS, OF PHILADELPHIA, PENNSYLVANIA.

GRINDING-MACHINE.

944,147.

Specification of Letters Patent. Patented Dec. 21, 1909.

Application filed August 21, 1908. Serial No. 449,674.

*To all whom it may concern:*

Be it known that I, HENRY B. NICHOLS, a citizen of the United States, residing at Philadelphia, in the county of Philadelphia and State of Pennsylvania, have invented certain new and useful Improvements in Grinding-Machines, of which the following is a specification, reference being had therein to the accompanying drawing.

My invention relates to grinding machines, and has for its object the production of a machine of this class suitable for grinding railway rails in place. The heads of such rails become corrugated or roughened in use, and it has been customary to use either portable files moved by hand over the rails, or some form of rotary grinders. Such manually operated devices are not only slow and inefficient, but are expensive to maintain as well as to operate, while the rotary grinders have proved to be unsatisfactory in practice, because of the wear on the wheels, which must constantly be taken up, and because they accentuate the hollows instead of smoothing them out.

According to my present invention I provide a truck with two wheels in tandem and a long narrow frame having a pair of side members supporting a platform over the wheels, and extended at one end to form guides for a reciprocating supplemental frame on which vertical guides are formed for a weighted holder or carrier in which a plurality of abrasive bricks are adjustably clamped. A motor is mounted on the platform, and working connections provided for reciprocating the supplemental frame and the carrier so as to move the bricks back and forth on the surface of the rail. The dimensions of the carrier and of the bricks employed are such as to bridge over any hollows in the rails, and the weight of the carrier maintains constant contact regardless of wear on the bricks.

Important features of the invention are the provision of braking means for both wheels, with elements acting in opposite directions, and the location of the motor and heavy operating parts directly over the wheels, whereby the frame is held stationary, and the grinder may be reciprocated over a particular spot for any desired length of time.

My invention is illustrated in the accompanying drawings, in which:

Figure 1 is a side view of my complete grinding machine upon a railway track, ready for operation. This figure is divided for convenience into two halves marked respectively (*a*) and (*b*). Fig. 2 is a plan view of the same. This figure is also divided into two halves marked respectively (*a*) and (*b*). Fig. 3 is an end view of the same, looking in the direction of the arrow in Figs. 1 and 2. Figs. 4, 5 and 6 are respectively a plan, a side, and an end view, on a reduced scale, of the trunk, with the other parts removed.

Referring to the drawings, it should be observed at the outset that the division of Figs. 1 and 2 into halves will be ignored in this description, and the same treated as if they were one, reference merely being made to Fig. 1 or Fig. 2 as the case may be.

There are three principal component parts of this invention, viz., the grinder G, the motor mechanism M, and the supporting truck C. (See Fig. 1.) Since the rails are to be surfaced along a straight line, and also because simplicity of design is essential in apparatus of this character, which has to be handled by persons who are ignorant and frequently careless, I have adopted a right line principle of design throughout. The truck is virtually a bicycle with girder frame, extending along and riding over the rail whose head is to be ground. The grinder is mounted at one end of this truck, and the motor mechanism at the other.

In order to hold the machine in proper vertical trim, an outrigger is provided, having a third wheel at its extremity gaged to run upon the mate rail. The motor is supposed to derive its power through temporary connections from the railway trolley wire or feeders, but of course this may be supplied in any other convenient way.

The truck wheels are provided with suitable brake mechanism to hold the machine stationary while the grinder is being operated.

With this brief preliminary description, a more detailed statement will be readily understood.

Referring particularly to Figs. 4, 5 and 6, I have therein shown the truck C with the other parts removed for the sake of clearness of illustration. It consists essentially of a girder frame built of side channel irons *c*, and transverse end pieces *c'*, connected by means of riveted angles or knees as usual in structures of this type. Upon the iron frame a platform $c^2$ is laid, to which the motor and other parts are bolted. On the inner side of the frame, are secured a pair of sockets $c^3$ from which project the converging arms of an outrigger $c^4$ connected at their outer end by a common socket-piece or cap $c^5$, carrying a stub axle $c^6$ for the wheel $c^7$ this being threaded for purposes of adjustment, and provided with a lock nut $c^8$. The two principal wheels of the bicycle truck are shown at $c^9$ and $c^{10}$, being fixed beneath the frame exactly on the center line thereof, and if necessary provided with lateral adjustments so that they may be accurately lined up with the grinder G. At one end the frame is provided with a transverse handle or push-bar $c^{11}$, and at the other end on the side opposite the outrigger, with a single grip or handle $c^{12}$. By means of these handles and the outrigger, the machine may be easily and quickly removed from and replaced upon the rails, and when in position may be propelled.

The girder frame in Figs. 4, 5 and 6 is shown broken away at the grinder end, the platform stopping short of that portion of the device, as indicated in Figs. 4 and 5. In Fig. 1 however, the frame $c$ is shown extended, with a slight drop at $c^{13}$, which permits the grinder carriage to be brought closer to the rail. This carriage is shown in Fig. 2 (a), and comprises a hollow slide frame $g$, and a heavy vertically movable cast-iron block $g'$ reciprocated by the frame $g$, and carrying the bricks or grinding bodies $g^2$ of carborundum or equivalent material. The frame $g$ has longitudinal reciprocating motion only, being driven back and forth by the motor, and held to the frame $c$ by the slide plates $g^3$ working upon a bed upon each side of the frame, between stops $g^4$. The block $g'$ on the other hand has both horizontal and vertical motion, traveling with the frame $g$ as it reciprocates, but permitted to rise and fall therein by the vertical guides $g^5$ carried on the frame and fitting vertically sidewise cut or cast in the block.

I have referred to the bricks $g^2$, which are formed of suitable abrasive material, and are adjustably held in a recess or recesses in the block $g'$. Adjustment of these bricks is necessary, because of possible variations in hardness and wearing quality. For this purpose the vertical pressure screws $g^6$ are provided, with lock nuts $g^7$. The outlines of the chamber for the bricks may be seen at $g^8$, and as shown the screws $g^6$ pass down into this chamber and have their heads bearing directly upon the respective bricks. Suitable friction devices may be interposed, such as caps or plates between the ends of the screws and the heads of the bricks. One pair of the screws and nuts $g^6$, $g^7$ serve for the attachment of a yoke $g^9$, engaging the terminal link of a chain $g^{10}$ attached to the upper end of a lifting segment $g^{11}$, pivoted at $g^{12}$ and fitted with a lever $g^{13}$ which when thrown down lifts the block $g'$ with its bricks out of grinding position, being then locked by the engagement of the stop $g^{14}$ upon the frame of $g^{15}$, this being bolted as shown in Figs. 1 and 2 upon a supplemental cross-beam or brace $c^{14}$ of the frame, and secured in addition by angles $c^{15}$ upon the platform $c^2$.

The grinding bricks when adjusted are adapted to be clamped between the solid abutment $g^{16}$ at one end of the block $g'$, and the end plate $g^{17}$ controlled by the locking bolt $g^{18}$, at the other end thereof. Suitable distance pieces are provided between the bricks, and when the bolt $g^{18}$ is set up and its lock nut tightened, the bricks are held together a solid unit. A unit of this character, built up of smaller units, is much better for my purposes than an undivided body of material would be, for reasons that will be sufficiently obvious to those skilled in the art.

The driving mechanism M consists of the motor $m$, a cam shaft $m'$ driven thereby, and a grooved cam block $m^2$ upon said shaft. This block in its rotation reciprocates the connecting rod D, which is connected to the grinder frame. The motor frames $m^3$ are bolted to the platform $a^2$, at the opposite end of the latter from the grinding mechanism. Upon the motor shaft is fitted a pendant $m^4$, which meshes with the wheel $m^5$, keyed to the cam shaft $m'$. The cam $m^2$ is provided with a continuous groove $m^6$ which is helical for a little less than 180° on each side, but circular for a short space at each end, thereby permitting a period of rest at each reversal of the connecting rod D. The motion is communicated to this rod through a roll $d'$ carried on a stud $d^2$ bolted to the upper end of a post $d^3$ on the rod D. The post $d^3$ is provided midway of its length with an enlargement $d^4$ bored to take over the guide rod $d^5$, projecting from and anchored in the bearing frame $m^7$. Both the frames $m^7$ and $m^8$ of the cam shaft $m'$ are bolted to the platform $a^2$. It may be here observed that where these and other parts are described as screwed to the platform, they may of course be screwed to iron bridges of the frame, or to the frame itself. The shaft D reciprocates in bearings $m^9$, in the frame pieces $m^7$ and $m^8$. It is made of sufficient diameter and mass to stand considerable rough usage, and some strains without being sprung or thrown out of alinement. At its outer end it is attached to the grinder frame by means of the elbow $d$, having a pivoted bearing $d^0$ at its lower end, and a gib and key connection $d^6$ at its upper end. By taking out the key, and throwing back the elbow $d$, the block and frame may at any time be removed.

For the purpose of holding the truck stationary on the rail R during grinding, I provide a pair of band brakes $e$ and $e'$, connected by adjustable links $e^2$, $e^3$ to opposite points $e^4$ and $e^5$ on a lever $e^6$ pivoted at $e^7$ and controlled through an extension arm $e^8$ and link $e^9$ by the end lever E. This lever is pivoted at $e^{10}$ and provided with a latch $e^{11}$ taking into the teeth of a ratchet arm $e^{12}$ bolted to the frame so that its center coincides with the pivot point $e^{10}$. The latch is controlled by a handle $e^{13}$ pivoted one side of the operating handle $e^{14}$, action being thus rendered both simple and powerful. The bands $e$ and $e'$ are stretched around friction drums $c^{90}$ and $c^{100}$ fixed on the outer ends of the main axles of the truck. The pivot post $e^7$ of the lever $e^8$ is bolted to the side frame $c$, through a reinforcing plate $e^{70}$, riveted to the frame. Little or no strain comes on this pivot post if the brake links are properly adjusted, because of the equal and opposite pulls. It should also be noted that the anchor posts $e^0$ and $e^{10}$ of the brake bands $e$ and $e'$ are located so as to produce an opposite drag on the two wheels, thus opposing maximum resistance to movement of the truck in either direction.

In operation, the machine is first lifted onto the track rails, with the truck body over the rail which is to be ground. It is then pushed along by means of the hand $c^{11}$ until the grinding bricks $g^2$ are in proper position, the brake lever E pulled over to lock the wheels, and the hand lever $g^{13}$ released from the stop $g^{14}$ and swung up so as to lower the block $g'$ until the bricks rest upon the tread of the rail. The motor $m$ is then started, using a suitable switch or rheostat which is not shown, as it may be of any usual or desired type and forms no part of the present invention.

It may be stated incidentally that I am of course not limited to the use of an electric motor, other motors, such as portable steam pneumatic, or hydraulic machines being available for this purpose. An electric motor will ordinarily be the most suitable however, and as the machine illustrated is designed for the use of such a motor, it will be claimed specifically herein.

The motor being started, the cam cylinder $m^2$ is rotated, and the roll $d'$ travels back and forth in its groove, producing a reciprocating motion of the plunger or connecting rod D which is communicated directly to the frame $g$ and thereby to the block $g'$ and the grinding bricks $g^2$.

I am fully aware that many changes may be made in the construction of this machine without departing from the general principles involved, or the spirit of my invention. For example, the cam cylinder $m^2$, instead of having a groove to receive the roll $d'$, may have a male cam or rib, working between a pair of rolls $d'$, this arrangement having the advantage that the rolls will turn in opposite directions continuously, without a reversal. A track brake, or some form of chocks may also be employed either in place of the band brake, or as auxiliary thereto. I further contemplate in some places, and in order to obviate the necessity for any brake on the wheels, the provision of a pair of slides or frames $g$, each with a block $g'$, the frame $c$ being lengthened out sufficiently for these parts to be placed end to end and in line with each other. The motor connections will then reciprocate these in opposite directions, which may be through a pair of cam cylinders $m^2$, or a single cylinder alined between a pair of plungers D, each having a stud, and these studs working in opposite sides of the groove $m^6$. Each of the two plungers would then be connected to one of the slides, and as they worked reciprocally on the rail the entire truck could be moved along continuously without interfering with the grinding. If a reciprocating steam pneumatic or hydraulic motor be used in place of the electric motor $m$, it is possible to do away with the cam drum $m^2$ entirely, connecting the plunger or rod D directly to the piston rod or its equivalent of the engine. For a steam engine the boiler would also preferably be mounted on the truck.

It is to be clearly understood that all such non-essential changes are to be included within the scope of the appended claims.

Having thus described my invention, what I claim and desire to secure by Letters Patent of the United States is:

1. A grinding machine comprising guides supported over the work, a frame adapted to reciprocate in said guides in a plane parallel to the surface of the work, a body of abrasive material, and a holder therefor adjustable in the frame toward and away from the surface of the work together with a motor for reciprocating the frame, substantially as described.

2. A grinding machine comprising a pair of parallel supporting members or guides, a frame fitted to slide between and upon said members, a weight holder or carrier fitted on slides in said frame so as to have motion perpendicular to the plane thereof, and means for reciprocating the frame, substantially as described.

3. A machine for grinding horizontal surfaces comprising a pair of parallel guide members, a frame fitted to slide between said members, a holder or carrier of relatively large mass fitted to said frame so as to have free vertical movement relatively thereto but to travel horizontally therewith.

a body of abrasive material in said holder, and means to reciprocate the frame on the guide members, substantially as described.

4. A machine for grinding horizontal surfaces comprising a main supporting frame having guideways, an auxiliary frame fitted to slide horizontally thereon, a relatively heavy holder or carrier moving horizontally with said frame, but free to move vertically therein, a body of abrasive material supported in said holder, means to lift the holder in the frame, and means to reciprocate the frame, substantially as described.

5. A machine for grinding horizontal surfaces comprising a main supporting frame having parallel horizontal guideways, an open auxiliary frame adapted to slide thereon, a relatively heavy holder or carrier traveling with said auxiliary frame but having free vertical motion therein, a plurality of bodies of abrasive material carried by said holder with clamping and adjusting means for the same, and means for reciprocating said auxiliary frame, substantially as described.

6. A machine for grinding horizontal surfaces comprising an open rectangular main supporting frame having horizontal guideways, an open rectangular auxiliary frame fitted to slide therein, a heavy holder or carrier recessed upon its lower side to receive a body of abrasive material, and fitted upon vertical slides within the said auxiliary frame, means for adjusting and clamping the abrasive body in the holder, a bracket or support carried on and extending above the main frame, lifting means for the said holder or carrier supported upon said bracket, and means to reciprocate the auxiliary frame, substantially as described.

7. A machine for grinding railway rails comprising a wheeled truck adapted to travel upon and over the rail to the ground, a reciprocating grinder carried in guides formed by a longitudinal extension of the truck frame, a driving motor for the grinder mounted on the truck, and a double acting brake with controlling means therefor, adapted to hold the truck motionless while the grinder reciprocates, substantially as described.

8. A machine for grinding railway rails comprising a wheeled truck having oppositely acting braking means for the two wheels adapted to hold it stationary upon a rail, an extension guide frame on one end said truck and a grinder adapted to reciprocate therein, together with a motor on the truck and operative connections between the grinder and said motor, substantially as described.

9. A machine for grinding railway rails comprising a wheeled truck having a two-way brake for holding it stationary upon a rail, an extension guide frame on said truck and a grinder adapted to reciprocate therein, together with a rotary motor mounted on the truck, a reciprocating plunger for driving the grinder, and a cam drum adapted to translate the rotary motion of the motor into reciprocating motion of said plunger, substantially as described.

10. A machine for grinding railway rails comprising a wheeled truck having a two-way brake for holding it stationary upon a rail, an extension guide frame on said truck and a grinder adapted to reciprocate therein, together with a rotary motor mounted on the truck, a reciprocating plunger for driving the grinder, and a cam drum adapted to translate the rotary motion of the motor into reciprocating motion of said plunger, the cam surfaces on said drum being shaped so as to give a dead stop to the plunger and grinder before each reversal of motion, substantially as described.

11. A machine for grinding railway rails comprising a tandem two-wheeled truck having an extended frame formed of iron members, the wheels of said truck traveling on, and alining the same with, the rail to be ground, guideways formed at one end of said frame, a grinding device fitted to reciprocate longitudinally on said guideways, reciprocating means on the truck for driving said grinding device, and a motor therefor also on the truck, substantially as described.

12. A machine for grinding railway rails comprising a tandem two-wheeled truck having an extended frame formed of iron members, the wheels of said truck traveling on, and alining the same with, the rail to be ground, guideways formed at one end of said frame, a grinding device fitted to reciprocate on said guideways, reciprocating means on the truck for driving said grinding device, and a motor therefor also on the truck, together with means for locking the truck wheels against motion in either direction, substantially as described.

13. A machine for grinding railway rails comprising an elongated frame with means to aline it over and parallel to a rail, guideways formed upon extensions of the side members of said frame, a weighted holder or carrier having a projecting body of abrasive material on its under side and fitted within said guides so as to have both longitudinal and vertical reciprocating motion thereon, a motor mounted on the frame, a reciprocating plunger mounted in guides on the frame, and connections from said plunger to the carrier and to the motor respectively, substantially as described.

14. A machine for grinding railway rails comprising an elongated portable frame with means for supporting it over and parallel to a rail to be surfaced, parallel extensions on the side members of said frame forming longitudinal guides, a pair of slides fitted upon said guides, a pair of vertical guides formed on said slides, a body of abrasive material, a weighted holder or carrier therefor having vertical slideways in its sides fitted to said vertical guides, a motor on the frame, and connecting means between said motor and the carrier, adapted to reciprocate the latter in the guideways on the frame, substantially as described.

15. In a grinding machine for railway rails, a wheeled truck having an elongated frame, motor and braking means on said truck, longitudinal guides formed on the end of the frame, and a grinder mounted to reciprocate in said guides in the axis of the frame, said grinder comprising a heavy body hollowed out beneath, a plurality of bricks of abrasive material arranged parallel to each other in the cavity of the holder, an adjustable pressure screw passing through the top of the holder over each brick, and clamping means on the end of the holder for all the bricks, together with a working connection between the holder and the motor, substantially as described.

16. A machine for grinding railway rails comprising a narrow elongated frame carrying a platform over part of its length, and having longitudinal side members forming guideways for the balance of its length, a pair of wheels journaled in tandem under the frame adapted to travel upon the rail to be ground, and to maintain the frame with its longitudinal axis in parallelism therewith, a motor on the platform, grinding means, and a holder or carrier therefor connected to the motor and arranged to be moved back and forth thereby on the guideways of the frame, so as to work in alinement with the wheels, substantially as described.

17. A machine for grinding railway rails comprising a narrow elongated frame carrying a platform over part of its length, and having longitudinal side members forming guideways for the balance of its length, a pair of wheels journaled in tandem under the frame adapted to travel upon the rail to be ground, and to maintain the frame with its longitudinal axis in parallelism therewith, a motor on the platform, grinding means, and a holder or carrier therefor connected to the motor and arranged to be moved back and forth thereby on the guideways of the frame, so as to work in alinement with the wheels, together with an outrigger supported from the mate rail to maintain the frame and grinder steady in operation, substantially as described.

18. A machine for grinding railway rails comprising a narrow elongated frame carrying a platform over part of its length, and having longitudinal side members forming guideways for the balance of its length, a pair of wheels journaled in tandem under the frame adapted to travel upon the rail to be ground, and to maintain the frame with its longitudinal axis in parallelism therewith, a motor on the platform, grinding means, and a holder or carrier therefor connected to the motor and arranged to be moved back and forth thereby on the guideways of the frame, so as to work in alinement with the wheels, together with means to maintain the frame stationary over the rail while grinding.

19. A machine for grinding railway rails comprising an elongated frame, a pair of wheels in tandem supporting and alining said frame, and a reciprocating grinder working in guides on the frame, and so maintained in alinement on the rail by said wheels, together with a motor for the grinder, substantially as described.

20. A machine for grinding railway rails comprising an elongated frame carrying a motor, a guideway, and a grinding device connected to the motor and thereby reciprocated in the guideway, together with tandem wheels carrying the frame and alined with the principal longitudinal axis thereof as well as the direction of motion of the grinder, and means to lock said wheels while grinding, substantially as described.

21. A reciprocating grinder comprising a hollow weighted carrier, a plurality of grinding bricks set parallel in said carrier, separate means for adjusting each brick, means for clamping all the bricks when adjusted, and means for reciprocating the carrier in the direction of its length, so as to work the individual bricks in tandem, whereby a cumulative effect is obtained and breakage or loss of adjustment of one brick does not affect the general operation.

In testimony whereof I affix my signature in presence of two witnesses.

HENRY B. NICHOLS.

Witnesses:
HARRY C. HEATON,
BENJ. STOTT.